(12) United States Patent
Linton

(10) Patent No.: US 6,822,181 B2
(45) Date of Patent: Nov. 23, 2004

(54) CONTAINER DIVERTER

(75) Inventor: Fredrick L. Linton, Belmont (CA)

(73) Assignee: Labatt Brewing Company Limited, London (CA)

(*) Notice: Subject to any disclaimer, the term of this patent is extended or adjusted under 35 U.S.C. 154(b) by 0 days.

(21) Appl. No.: 09/891,616

(22) Filed: Jun. 27, 2001

(65) Prior Publication Data
US 2003/0010682 A1 Jan. 16, 2003

(51) Int. Cl.⁷ ................................................ B07C 5/34
(52) U.S. Cl. ........................ 209/524; 209/523; 209/652
(58) Field of Search .............................. 209/524, 652, 209/653, 654, 657, 528, 529, 523, 526, 525; 318/696, 47, 690

(56) References Cited

U.S. PATENT DOCUMENTS

| | | | |
|---|---|---|---|
| 2,100,227 A | * 11/1937 | Stoate et al. ................. 209/514 |
| 2,945,588 A | * 7/1960 | Fenn et al. .................. 209/524 |
| 2,998,117 A | * 8/1961 | Newburn ..................... 198/367 |
| 3,038,606 A | * 6/1962 | Leaver et al. ................ 209/524 |
| 3,133,640 A | 5/1964 | Calhoun et al. .......... 209/111.5 |
| 3,441,132 A | * 4/1969 | Browning .................... 209/3.2 |
| 3,471,012 A | 10/1969 | Calhoun ....................... 209/74 |
| 3,581,889 A | * 6/1971 | Abraham et al. .............. 209/74 |
| 3,730,325 A | * 5/1973 | Goodwin ..................... 198/395 |
| 3,789,286 A | * 1/1974 | Towne et al. ................ 318/696 |
| 3,913,743 A | * 10/1975 | Nelson ........................ 209/544 |
| 4,142,636 A | * 3/1979 | Planke ........................ 198/367 |
| 4,251,000 A | * 2/1981 | Templeton ................... 209/547 |
| 4,501,365 A | 2/1985 | Peyton et al. ................ 209/548 |
| 4,549,272 A | * 10/1985 | Hagan et al. ................ 198/358 |
| 4,694,158 A | * 9/1987 | Leser .......................... 209/524 |
| 4,711,357 A | * 12/1987 | Langenbeck et al. ....... 198/367 |
| 4,750,620 A | 6/1988 | Braschos ..................... 209/523 |
| 4,836,387 A | * 6/1989 | Cottrell ....................... 209/657 |
| 4,986,407 A | * 1/1991 | Heuft .......................... 198/367 |
| 5,469,974 A | * 11/1995 | Hagan ......................... 209/652 |
| 5,918,724 A | 7/1999 | Terrell et al. ................ 198/367 |
| 5,979,635 A | 11/1999 | Calhoun ...................... 198/456 |
| 6,041,910 A | * 3/2000 | Avery et al. ............ 198/370.07 |
| 6,043,504 A | 3/2000 | Fujita et al. ................. 250/573 |

FOREIGN PATENT DOCUMENTS

| | | | | |
|---|---|---|---|---|
| DE | 2728473 | * | 1/1978 | ................. 209/524 |
| DE | 2805656 | * | 8/1979 | ................. 209/523 |
| DE | 3510755 | * | 9/1986 | ................. 209/524 |
| EP | 0903309 | | 3/1999 | |
| EP | 0911281 | | 4/1999 | |

* cited by examiner

Primary Examiner—Donald P Walsh
Assistant Examiner—Daniel K Schlak
(74) Attorney, Agent, or Firm—Levy & Grandinetti

(57) ABSTRACT

The present invention provides a device and method for selectively removing an article from a stream or line of similar articles travelling in a pathway on a transport system such as a conveyor. The invention utilizes a synchronous electric motor which, in response to a signal to reject a specific article in the stream, rotates an article-contacting member or paddle into the path of the stream of articles travelling along the pathway whereby it contacts and smoothly removes that article from the stream. The use of a synchronous motor to effect the rotation of the paddle is very important to the present invention.

18 Claims, 5 Drawing Sheets

CONTAINER DIVERTER

BACKGROUND OF THE INVENTION

1. Field of the Invention

The present invention relates to the handling of articles, such as beverage containers moving at high speed in modern production facilities. Of special interest is the use of the invention in the food and beverage industry and in particular the handling of bottles and cans containing alcoholic and non-alcoholic beverages. Examples of such beverages include beer and beer-based drinks such as shandies; coolers and low or non-alcoholic beers; non-alcoholic soft drinks such as colas; water; fruit juices and the like.

2. Description of Prior Art

In many industries and, in particular, the beverage industry, product units such as bottles and cans are often transported in production facilities in lines or streams at high speed using conveyor systems. In some instances, the pathway defined by the conveyor is not much wider than the moving container but is sufficient to allow for free movement of the container along the conveyor. The conveyor is set up such that the containers generally travel along it adjacent to one sidewall or rail of the conveyor. This generally occurs even if the width of the conveyor is greater than the width of the container. For example, empty beer bottles, (very common articles to which the present invention relates) are generally required to be transported from a rinsing station to an automated filling device and, subsequently, to a bottle labeling device, often at rates of up to 1500 or more bottles per minute. Obviously, in an operation involving so many bottles processed at those rates, there are going to be a number of bottles which are commercially unacceptable for various reasons. For example, a bottle may be under-filled, or over-filled, with beer or the bottle label may be mis-aligned or even totally missing. Such bottles are not acceptable and must be separated from the acceptable bottles prior to the latter proceeding to a packaging station. There are many known systems for inspecting the stream of bottles and detecting any such unacceptable or defective bottles. (refer for example to U.S. Pat. Nos. 5,979,635 and 6,043,504) Once any unacceptable bottle has been detected it must be removed from the line or stream. It will be appreciated that commercial reality means that the production line cannot be stopped or generally even slowed down each time an unacceptable bottle has to be removed. It is also important to note that adjacent bottles in the moving line might be, and often are, in contact. This clearly complicates the removal of each unacceptable bottle since it must be removed without affecting the speed or direction of movement of the two adjacent and acceptable bottles and the effect the latter bottles may have on bottles adjacent to them and so on. Moreover, although in some instances, simple rejection to a rejection bin of unaccepted bottles is all that is required, there are instances when it is desirable to direct rejected bottles to one of several possible locations and in a controllable manner; in essence, sort the bottles. For example, a bottle, which has been found to have lower than the prescribed amount of beer, (i.e. it is a "low-fill") might be re-directed to a station which empties the bottle of beer and the beer and the bottle are reclaimed. In another case a bottle with the label missing could result in the rejected bottle being returned to the labeller. In contrast, an unacceptable can is not usually reused (apart from being recycled for metal content) and hence, such sorting of rejected cans would probably not occur.

Many commonly used rejection or sorting systems involve an actuator assembly which includes a piston carrying a bottle-contacting member or pad which assembly is located adjacent the side of the conveyor, the actuator member being arranged to extend across the conveyor at right angles to the direction of travel of the bottles and to be retracted along the same path. As it advances, the pad contacts the body of the moving bottle to be diverted with more or less force depending on a number of factors. The bottles are essentially struck out of the moving line of bottles hopefully leaving the adjacent, and especially the immediately following, bottle unaffected as regards their velocity and direction. The diverted bottles may be directed off the conveyor to a collection receptacle or redirected on to another conveyor adjacent the first conveyor; refer, for example, to U.S. Pat. No. 3,133,640. A number of disadvantages are associated with this type of device. The use of a fluid, air in the case of a pneumatic activator, can be inconvenient and even cause problems not the least being the constant need to make adjustments to it for various reasons. For example, fluctuations and especially reduction in, or loss of, pressure can result if the device has to operate virtually continuously for an extended period and the air pressure becomes inadequate to sustain the desired piston rejecter stroke. In this situation, additional equipment such as an accumulator tank may be necessary. Such extended use situations can happen if the bottle filler is incorrectly adjusted and a large number of low-fills are produced. Another significant problem is that the pad is relatively narrow and, to be effective, must contact the moving bottle at virtually the longitudinal axis of the bottle to effect a clean redirect. It will be appreciated that with all the variables in this system fine tuning even to maintain a centre of bottle hit is a constant issue. Consequently, as can happen, the actuator is unavoidably triggered early or late, then the pad contacts the bottle off-centre possibly at the leading or trailing edge of the bottle and can cause same to spin or otherwise become unstable which, in combination with the "pull" from the conveyor, can result in toppling, hitting an adjacent bottle; etc. Also, the actuator is extended and withdrawn at right angles to the direction of travel of the bottles and both actions must occur prior to the bottle following the rejected bottle arriving at the actuator. If the actuator cycle is not fully completed in time, the next bottle will strike a part of the actuator assembly blocking the conveyor and this would definitely adversely disrupt the flow of bottles probably requiring the conveyor to be stopped. Systems of this type are called "boppers" or "bang-bang" systems because of their mode of action. In fact, the mode of action can result in cleanly rejected bottles being thrown over and cause significant problems downstream even if the bottles do manage to exit and remain outside of the path of the line of accepted bottles. U.S. Pat. No. 5,979,635 discloses a system of using a type of divertor assembly of the bopper-type as described above but with provision to extend the servoactivator in a controlled predetermined manner to a position adjacent to the article to be deflected where, preferably, it pauses prior to initiating the actual diversion of the article according to an ejection waveform. This is said to reduce the impact of the pad strike on the container and minimize the opportunity for the bottle to fall over. It does not, of course address other problems associated with this type of divertor. It also requires relatively complex and expensive equipment to detect the lateral position of the bottles on the conveyor. In an attempt to reduce any tendency to topple the bottles, the pad is usually constructed from a soft plastic material. This, however, introduces its own problems with respect to increased wear etc. loss of controlled contact with the bottle thus requiring relatively frequent maintenance.

In any event, all these fluid-based systems are subject to certain inherent or built-in delays in their operation in view of the several mechanical etc. steps in the system which steps need to be completed from the time the signal to reject is received by the device to the time the bottle contacting bopper is returned to its base position. In other words there are lags and overshoots inherent in such systems which are at best only minimized.

There are other types of divertors, for example, those which utilize a system which is generally able to effect transfer of a article from one conveyor to another over an extended length of travel and time, refer for example to U.S. Pat. No. 3,471,012. The smoothness and gentle transfer action involved should allow these divertors to be operated at high rates of transfer compared with the relatively more violent actions of the bopper-type devices. However some of these devices, refer for example to that described in U.S. Pat. No. 3,471,012 use selective activation of the article pusher members and this involves a substantial time factor. A similar type of device is described in U.S. Pat. No. 4,501,365 this device using a plurality of article pusher members controlled by an upstream apparatus for determining the relative position of articles on the conveyor. This device is extremely expensive and complex involving high maintenance and physically significant floor space.

SUMMARY OF INVENTION

The present invention provides a device and method for selectively removing an article from a stream or line of similar articles travelling in a pathway on a transport system such as a conveyor. The invention utilizes a synchronous electric motor which, in response to a signal to reject a specific article in the stream, rotates an article-contacting member or paddle into the path of the stream of articles travelling along the pathway whereby it contacts and smoothly removes that article from the stream. The use of a synchronous motor to effect the rotation of the paddle is very important to the present invention. Such a motor, characteristically, (i) Has an extremely fast response time (ii) Can readily and easily be programmed to rotate a desired amount and (iii) Return to its original or base position extremely rapidly.

The manner in which the synchronous motor operates will be well known to one skilled in the art. However, briefly the motor has a built in program which effects a "count" which represents one revolution of its drive shaft. For example, the count may be 8000. According to the present inventors, if the paddle is mounted directly on the drive shaft, this would mean that the paddle member would rotate 360° for a full count of 8000. It is therefore, a relatively easy matter to program the motor to turn its drive shaft a set number of counts which equates to a desired part-rotation of the shaft which itself equates to a set degree of rotation of the paddle across the pathway. The count number entered into the motor and hence the amount of arc travelled by the paddle can depend on bottle type, conveyor track and track lubrication type. The speed and extent of the rotation of the paddle is important to the amount of thrust imparted to the article to be removed from the line and enable it to reach its required destination. In general, the articles quite frequently travel relatively close to the sidewall or rail of the conveyor and the articles in a stream maintain a similar distance from the sidewall. For example, in a modern brewery bottling line, the bottles will generally not be more than about 1.25 cm and usually only about 0.15 cm from the sidewall and the smooth paddle action of the present invention can handle such variances. However, to optimize performance, some adjustment of the speed or acceleration of the paddle may be required. The paddle is, generally, located in a slot formed by removing a short section of the sidewall and hence the distance the line of articles is laterally spaced from the paddle is about the same as from the sidewall. The paddle may be driven indirectly by the motor through mechanical linkages, gears, belts or the like. However, in a preferred embodiment, the paddle is mounted directly onto the drive shaft of the motor, this avoiding any lag or delay in rotation of the paddle because of mechanical linkages between the drive and the paddle. Initially the paddle is lying at a rest position generally adjacent and parallel to the path of the stream of articles. The paddle member which is initially parallel to the line of bottles, as it rotates is at a diminishing obtuse angle to the path of the stream of articles. The movement of the paddle is arranged to commence as the article to be rejected reaches the location of the paddle, generally the upstream part of the paddle.

Consequently, as the paddle swings into the path of the article to be rejected, the article will contact the moving paddle which will, at that point, be angled slightly into the travelling article path. It will be appreciated that this type of engagement between the bottle and the paddle means that the position of the article on the conveyor, laterally across the conveyor and longitudinally along the paddle length, is not as critical as it is in the case of the prior out devices since the article can slide along the paddle to some extent and for a relatively long period of time as it is swept out of the stream. Following that initial engagement the paddle continues its rotation until it has rotated through a predetermined angle or degree of arc which, in combination with the speed the paddle moves determines the force applied to the article and distance and direction the diverted article takes. In fact, the paddle accelerates and subsequently, decelerates to a stop, in the embodiments where it then reverses motion to regain its rest position. The action of the paddle may be likened to that of a sling as it sweeps the article out of the line of articles rather than a trust action used by the prior and bopper type devices. The shape or configuration of the paddle can vary depending on the articles, which are to be handled. Article characteristics such as height, length and width as well as weight distribution and centre of gravity can have an effect on the paddle configuration. Such factors will also need to be taken into account when choosing the required synchronous motor especially the weight of the article involved. For example, if the article is a rectangular box having a low height relative to its length, then the risk of it being tipped over when being contacted by the paddle is small and the height of the paddle is not critical. However, in the opposite situation, where an upright thin article is involved, for example a bottle, (the specific example chosen to describe the present invention) the vertical location along the article where the paddle exerts its diversion thrust becomes important. As indicated earlier, this is the case when the article is circular and especially when this has a high height-to-width ratio and may be in a relatively unstable equilibrium state. Of particular note is when the article is a bottle especially when filled. In this situation, care must be taken to minimize the possibility of the bottle being toppled by being contacted at a position too high or too low up the bottle by the paddle. In such cases, if contact is made too high up the bottle, rather than the upright bottle moving across the conveyor in an upright orientation, the bottle neck may rotate away from the paddle: when contact is made too low, then the bottle neck may rotate toward the paddle. In either case, the bottle may have a tendency to topple. In fact it has been found that the risk of an article, especially bottles and those having a similar weight/height profile, falling can be reduced by ensuring that the force exerted on the article by the sweeping motion of the paddle is applied, at least initially, through the article, in this case a bottle, at a position at about the bottle centre of gravity or a short distance there below. This reduces or prevents any tendency for the edge of the base of the bottle radially opposite the point of contact of the paddle with the bottle from being urged with any significant force against the conveyor surface thereby increasing resistance to the bottle commencing to slide laterally across the conveyor possibly causing it to tip over and fall. In summary, there is little or no tendency for the then edge of the bottle to "dig-in" and cause a problem.

However, in many operations and the bottle example referred to above is one, a lubricant is used to reduce the friction between the bottle base and the conveyor surface and assist the bottle slide. This appears to function adequately once the bottle starts to slide.

However, it is believed that the lubricant on the conveyor can itself cause a problem namely the base of a bottle may, as it travels along carried by the conveyor because of surface tension or other effects, have a tendency to adhere to the conveyor surface. In such a case, the action of the paddle can have the effect of moving the upper part of the bottle without, initially, the base sliding on the conveyor. The result again could be the bottle topples over. In a preferred embodiment of the invention the paddle plate is inclined slightly—say 5–10°—from the vertical toward the bottle pathway. In this way, the upper edge of the paddle plate contacts the bottle fractionally before the remainder of the plate. This provides for a brief movement—small rotation in a vertical plane—of the bottle, this breaking any "seal" between the conveyor track and the base of a bottle. However, immediately following that action, the bottle body is contacted by the remainder i.e. lower portion of the paddle plate and any further rotational movement of the bottle is prevented, the bottle is rapidly righted, and commences sliding in an upright condition across the conveyor. It should be borne in mind that the action to right the bottle following the seal must be rapid since otherwise, the rapidly moving conveyor would pull the angled bottle, which would be unstable at that point, and tend to make it topple.

It will be appreciated that the orientation of the paddle in this preferred embodiment also takes into account tendencies of modern beverage bottles, especially beer bottles, to have a cylindrical body whose wall slopes slightly inward from the lower portion above the base to the shoulder area. In addition, the area immediately above the base extends radially further outwardly than the remainder of the main body area to provide a "bumper" zone. If adjacent bottles do contact each other it is via the bumper zone which prevents the upper cylindrical body areas from contacting. Since the body labels are usually carried by such areas, scuffing of the labels is also prevented or reduced.

The present invention has been described in detail with reference to the brewing industry and in particular, the handling of bottles, both full and filled with a beverage, at high speed. However it will be appreciated that it applies to any application where it is necessary to sort, divert or reject an unacceptable item from a line of such items travelling on a conveyor. It could, for example be used to reject or sort boxes; food items, many articles of manufacture, etc. all of which are able to be checked against standard characteristics and need to be sort or rejected based thereon. Obviously, items different from the specifically described bottles may require changes in the elements of the invention for example, a more powerful synchronous motor; change in paddle design etc. but these required adjustments can be determined and implemented by a man skilled in the art.

BRIEF DESCRIPTION OF THE DRAWINGS

The present invention will be further described but not limited by reference to the accompanying drawings as follows.

DETAILED DESCRIPTION OF INVENTION

Figure 1:
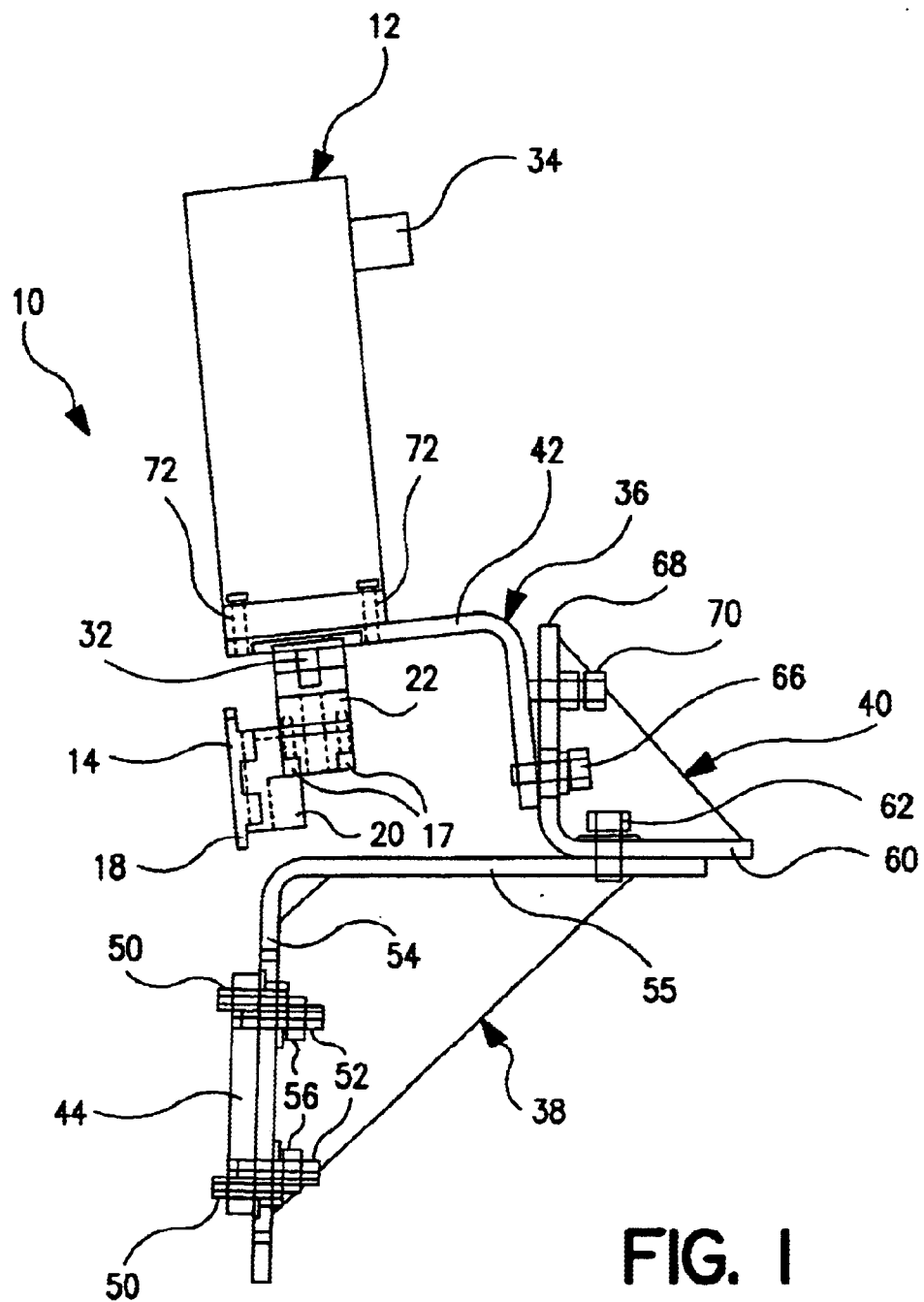
FIG. 1 is a cross-sectional view of a deflector device according to the present invention.

In one embodiment, the present invention provides: a method for diverting articles selected for removal from a stream of articles travelling along a pathway on a conveyor, said method comprising the steps of: locating adjacent said pathway a deflector member adapted to rotate into said pathway to contact and controllably sweep selected articles from said stream of articles; following removal of each selected article from said stream, reversing the rotation of said deflector member thereby removing same out of said pathway to allow subsequent non-selected articles in said stream to continue along said pathway without being impeded by said deflector member; and said deflector member being rotated by a synchronous motor acting in response to a predetermined signal to cause the said rotations of said deflector member.

In another embodiment the present invention provides: a device for diverting an article selected for removal from a stream of articles travelling along a pathway on a conveyor said device comprising in combination a synchronous electric motor and an article deflector member, the latter being adapted to be: located adjacent said pathway; rotatable by said motor into said pathway to contact and controllably sweep a selected article from said stream and, rotatable by said motor out of said pathway to allow subsequent unselected articles to continue travelling along said pathway without contacting said deflector member.

It is preferred that the article deflector member is mounted directly on the drive shaft of said motor.

In operation, the synchronous motor is activated by a signal emanating from an article inspection system. A number of such systems are commercially available refer for example to the previously referred to U.S. Pat. No. 5,979, 635, of Industrial Dynamics Company Limited of Torrence, Calif. and U.S. Pat. No. 6,043,504 of Idec Izuml Corporation of Japan and such systems need not be described here in detail. However, to summarize, such systems and others inspect containers or products for a variety of characteristics, it will be appreciated that such characteristics may be desirable simply relate to a sorting of articles based on size etc. or in the case of the beer bottle embodiment, may relate to an unacceptable characteristic, a low fill on the line. In any event, following an evaluation based on the inspection system sensors' findings, decision is made to allow or reject each specific article in the stream of bottles passing through the inspection station. The detection system, having determined that an article is defective and is therefore selected for rejection or re-direction, passes the appropriate signal to the deflector or sorting system. It will be appreciated that there may be and usually is, when using such systems, a delay between the decision by the inspection system to reject and the deflector system carrying out the rejection, this representing the time required for the selected article to travel from the inspection station to the deflector station. Again, the delay programme of the inspection system are well known and need not be described in detail here. This intentional delay is to be differentiated from the mechanical and other lag times inherently associated with the mode of operation of the deflector unit itself following it receiving a signal to reject an article.

Turning to FIG. 1, this shows a vertical cross-section through a divertor device of the present invention secured to an associated bracket assembly. The divertor unit generally designated 10 comprises an electric synchronous motor 12 (model BLX234A2E000 from Thompson Industries Inc., Thompson Control Division, 2 Channel Drive, Port Washington, N.Y. 11058) and secured thereto an article deflector member or paddle unit 14, the latter consisting of a mount 16 carrying a rectangular bottle-contacting plate 18. Note this Plate 18 has a length of about the diameter of a bottle. Secured to the upper portion of mount 16 by two bolts (not shown), which extend up through the base 20, is a clamping collar 22. Collar 22 has a grub bolt 24 located in internal bore 26, which bolt 24 extends through the collar 22 across slot 28 to enter and engage its associated nut (not shown) tapped internally in collar 22. Collar 22 is also provided with a bore 30. The mount 16 is made of a rigid plastic material namely polyamide as is the contact plate 18 which has a relatively smooth surface. Plate 18 is secured to mount 16 by friction via joints 19 and 21 (refer FIG. 2b). Mount 16 is, to some extent, cut-away to reduce weight. It will be appreciated that the plate material is very rigid and hard wearing requiring essentially no maintenance. It needs to be replaced only after a prolonged period of use especially compared with the softer pads used in prior out devices. The length of plate 18 is about or just less than the diameter of the bottles travelling on the conveyor 48, namely about 69 mm and its height is about 55 mm. It is angled to the vertical—refer FIG. 3—about 5°, that angle being exaggerated for clarity.

Figure 2A:
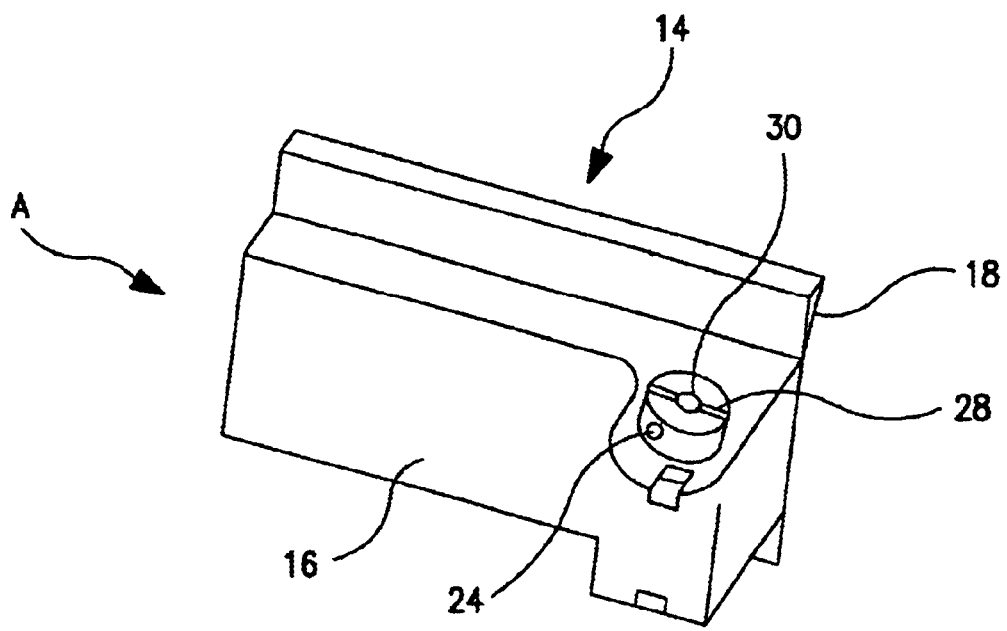
FIG. 2a is angled perspective of the paddle unit shown in FIGS. 1 and 2b is an end elevation in the direction of arrow A in FIG. 2a of the paddle unit.
Figure 2B:
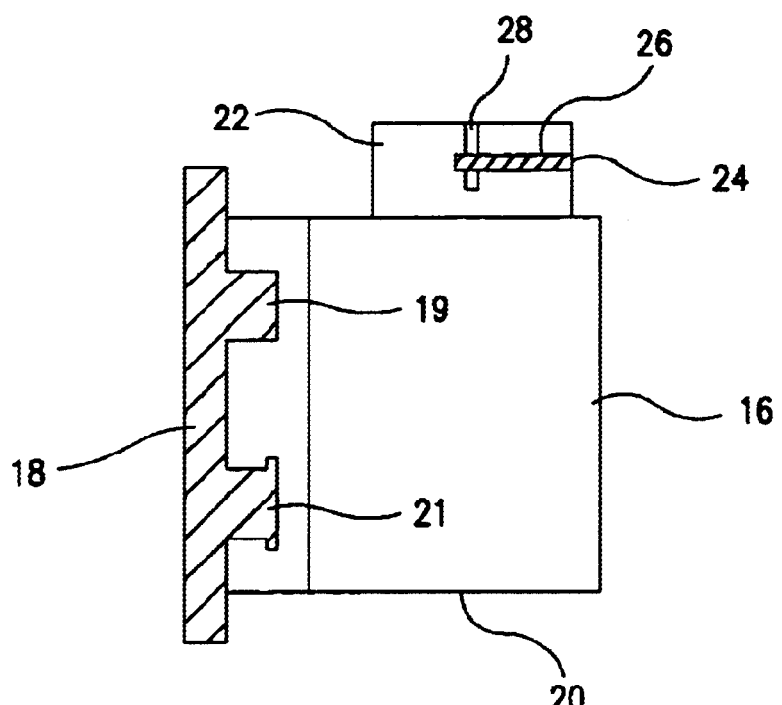

As shown especially in FIG. 2a, the paddle unit 14 is adapted to be secured to the shaft 32 via bore 30 which is located toward one longitudinal end of the unit 14. This is for convenience in this specific embodiment. In other embodiments, it may be preferable to locate the bore i.e. the vertical axis about which plate 18 would rotate, in the centre part of unit 14. The design is chosen to best suit the specific application requirements.

Figure 4:
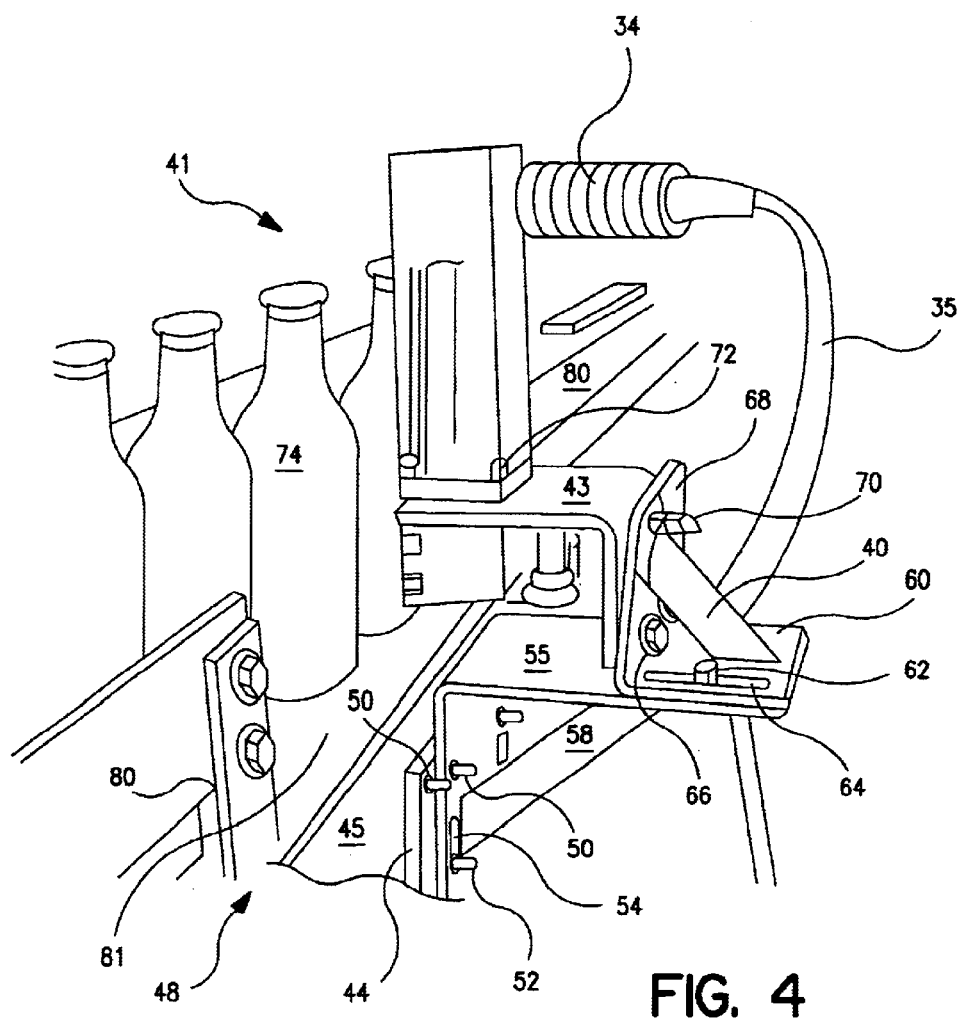
FIG. 4 is an angled perspective view of the present invention installed on a bottle conveyor.

The paddle unit 14 is secured to the drive shaft 32 of motor 12 by locking collar 22 and specifically, by tightening grub bolt 34 when motor drive shaft 32 has been located within bore 30. Motor 12 is supplied with power and signals from a detection unit through connection 34 via power and information transmission lines 35—refer FIG. 4.

The divertor unit 10 is supported and carried by a bracket assembly generally designated 36. This comprises three separate brackets numbered 38, 40 and 42 respectively. Bracket 38 consists of a plate 44 which is secured to a support member 45 of the conveyor 48 via bolts 50. Extending from plate 44 are bolts 52 which are adapted to extend through slots 54 vertical limb 55 of L-shaped bracket 38 and be, secured by nuts 56. These allow bracket 38 to be vertically adjustable and then locked into place via bolts 52. Bracket 38 also has a metal gusset 58 welded to and joining both limbs of the bracket to provide structural rigidity. Turning to bracket 40 this is similar to bracket 38 but smaller. One limb 60 is secured to limb 55 of bracket 38 via bolts 62 which extend through slots 64—refer FIG. 4. This arrangement allows bracket 40 to move horizontally for adjustment toward and away from the conveyor 48 and then be locked in the desired location by the tightening of screws 62. Turning to bracket 42, this is secured to bracket 40 via first bolts 66, their associated holes through vertical limb 68 of bracket 40 being adapted to receive bolts 66 and allow for some movement in a vertical plane. Adjustment bolt 70 is tapped into vertical limb 68 of bracket 40. These in combination with bolts 70 provide an adjusting system where limb 43 can rotate to a limited extent in a vertical plane and be secured at any position within that range of rotation. Finally, motor 12 is secured via bolts 72 to the upper limb 43 of bracket 42. The divertor unit 10 can be seen attached via bracket assembly 36 to a conveyor 48 in FIG. 4. It should also be noted that a section has been omitted from conveyor sidewall 80, and the plate 18 is located in that opening 81, approximately in line with the two sections of wall 80 adjacent to and defining opening 81.

Figure 3A:
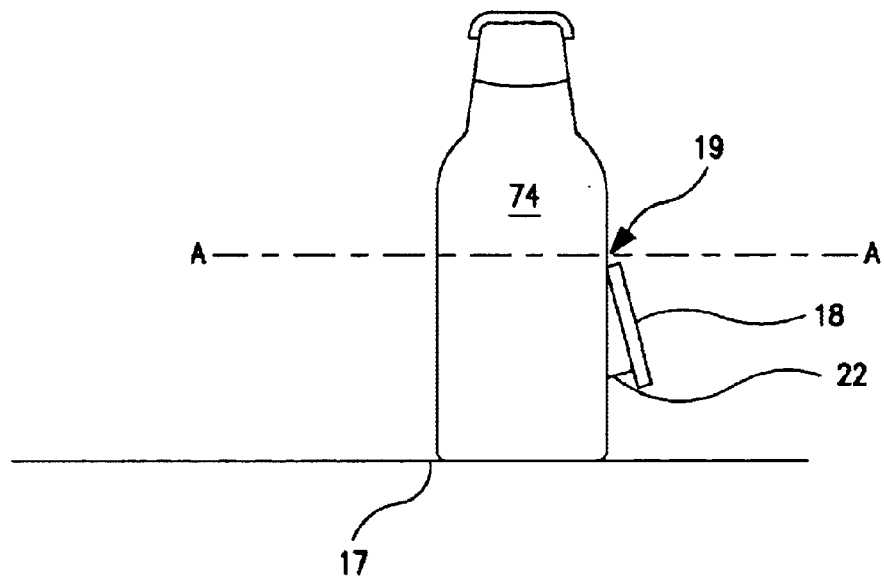
FIG. 3 comprises diagrammatic cross sectional views showing a bottle on a conveyor, in FIG 3a at the point the paddle plate is initially contacting the bottle, (the angle of the paddle plate to the vertical being exaggerated) and in FIG. 3b secondary contact occurring slightly later in the rejection stroke.
Figure 3B:
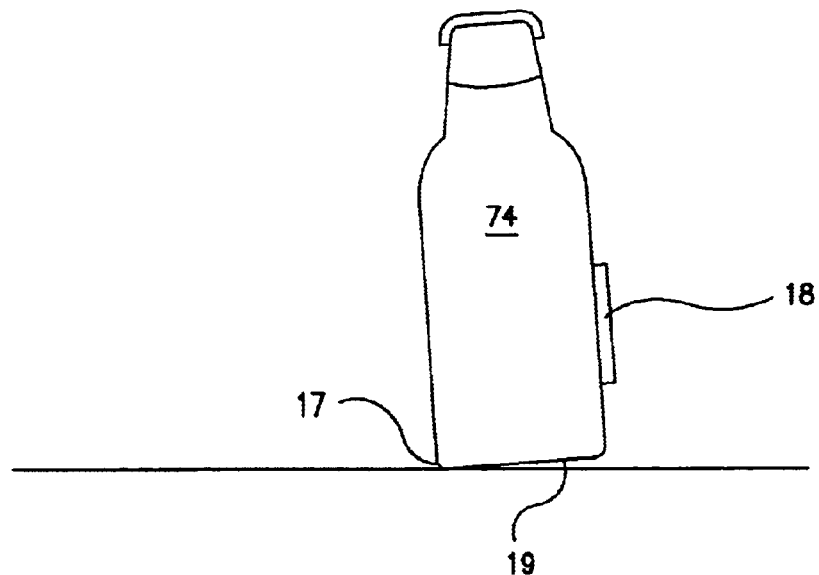

In summary, bracket assembly 36 via the combination of the three individual brackets 38, 40 and 42 provides for vertical adjustment; horizontal adjustment; and angle adjustment in a vertical plant. Since paddle unit 14 is secured directly to motor 12 via shaft 32, adjustment of the location and angle of the motor 12 relative to the conveyor 48 also adjusts the location and angle of the paddle 14 and in particular, the bottle contacting-plate 18. It has been found that a small deviation from the vertical of plate 18 assists in maintaining diverted bottles in an upright condition as they leave the deflector and move across the conveyor 48. In this embodiment of the present invention,—refer FIG. 3a—an deviation of about 3°–5° anti-clockwise from the vertical i.e. the upper corner 19 of plate 18 is closer to the conveyor path and hence the line of bottles 74 than the lower corner 21, has been found preferable. Also shown in FIG. 3 is the point or edge 17 of the bottle, this being radially opposite the point where plate 18 contacts and acts on the bottle 74.

Initially, the bottle when resting on and being carried by the conveyor because of lubricant located on the conveyor has a tendency to adhere to the conveyor surface. Consequently, the initial contact between corner 19 and the bottle can still result in the bottle tending to rotate about bottle edge 17 and become unstable and under the influence of the moving conveyor leave the deflector unit in an uncontrolled condition. Consequently, in the shown preferred embodiment, the plate 18 is angled to the vertical about 5°. It is believed that this small angle is sufficient to allow the bottle to rotate in a vertical plane a small amount which is sufficient to break the "seal" between the bottle base and the conveyor. Immediately thereafter, the lower portion of plate 18 contacts the bottle also and allows the bottle to righten to maintain control of the movement of the bottle so that when it leaves the paddle plate 18, it is in a stable equilibrium and exits the line and successfully moves to the desired location be it a receptacle or another conveyor.

Figure 5:
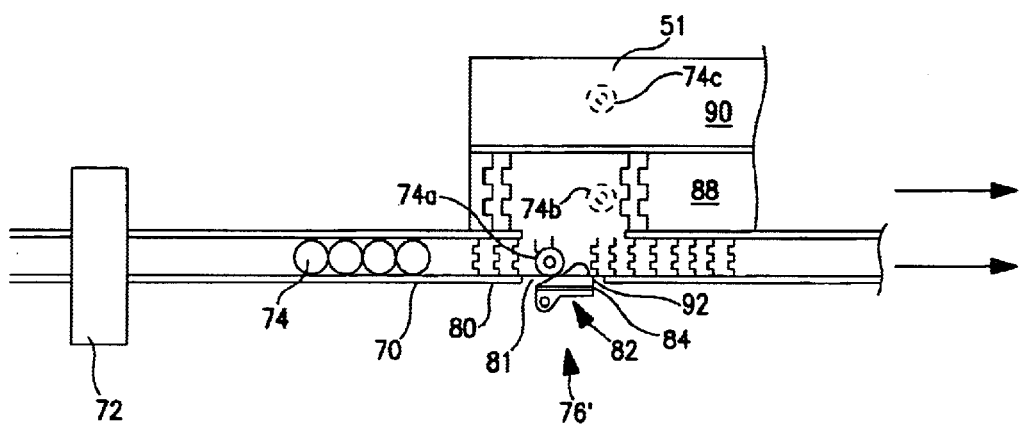
FIG. 5 is a diagrammatic, plan view of a divertor system of the inventor this showing a main conveyor, associated secondary bottle take-off conveyor and bottle rejection table showing in solid a deflector plate of a divertor of the present invention in its rest position and, in phantom, at the end of its diverting position extending across the pathway of the conveyor for a stream of travelling bottles.

Turning to FIG. 5, this is a diagrammatic plan view of a conveyor system incorporating the present invention. A bottle input conveyor 70 is provided with a bottle inspection device 72 adapted to inspect bottles travelling in a stream on conveyor 70 in the direction of the arrow. A deflector device 76 of the present invention is located downstream of inspection station 72 and adjacent conveyor sidewall or rail 80. Of deflector device 76, only the paddle unit 82 is actually shown (in plan) with bottle contact plate 84 being shown (in solid) in its base or rest position generally adjacent, and parallel to conveyor sidewall 80. The vertical position of paddle unit 82 relative to the conveyor 70 is set so that upon rotation, bottle contact plate 84 can swing across the conveyor and make contact with a selected bottle at the desired position on the bottle wall—refer FIG. 3—travelling thereon in the direction of the arrow. The conveyor wall 80 at the location of the deflector 76 and, more specifically, adjacent bottle contact plate 84, is cut away to provide a gap to allow for the rotation of the plate 86 of the paddle unit 82 across the conveyor 70.

Located adjacent and parallel to, conveyor 70, but on the opposite side thereof to deflector 76, is a bottle take-off, conveyor 88. On the other side of conveyor 88 is a bottle receiving table 90 this being located to receive totally unrecoverable rejects. Rotation of the paddle 82 in an anti-clockwise direction results in the bottle contact plate 84 moving across conveyor 80—the new position thereof being shown in phantom at 92 contacting bottle 74a. Also shown in phantom are previously deflected or rejected bottles 74b and 74c.

As indicated earlier, in the case of the specific synchronous motor BLX234, the full count is 8000. Since the paddle is mounted on the motor shaft 32, this means that the paddle member would rotate 360° on a full count. In this specific case, a 21° rotation of the paddle which is required to provide the thrust necessary to move the bottles out of the line on to the take-off conveyor is achieved by programming the motor with a count of 525 (525/8000×360=21°). The count of 525 represents the distance from the base or rest position of the paddle 18 adjacent a conveyor to its full extension over the conveyor required to effect the desired rejection of the bottles. Following completion of the initial rotation, the programmed reverse rotation immediately occurs returning the paddle to its original and rest position outside the pathways this completing the cycle. The motor cannot respond to another signal, and hence the paddle cannot move to reject another bottle, until that cycle is complete. However, the characteristics of the motor are such that it is able to complete that cycle extremely rapidly and sufficient to handle the high speed rejection of bottles required by modern facilities. It should be noted that even with the high rates involved, the device is able to reject a single bottle even when the bottles in the rapidly moving line are in contact with each other. Further, it should also be noted that even when adjacent bottles are required to be rejected, the present invention completes a full cycle in respect of each bottle. Consequently, each bottle is smoothly removed by the same sweeping action and the second and subsequent adjacent bottles in a line to be rejected do not encounter a paddle resting in the in pathway. This is important since the synchronous motor can be programmed to provide a different rejection action, and thereby controllably direct even adjacent bottles to different destinations, in response to it receiving different signals from a sensing station. The above calculation is given only for bottles to be moved to the adjacent conveyor. The motor parameters required to move bottles to the table 90 or other destinations can readily be calculated. Such calculations might require taking into account a different deflector plate design, weight etc. but this is readily achieved by simple system tests. Consequently, say 50 adjacent bottles are to be rejected—some for absence of crowns; some for being low fills etc., each can be dispatched to the correct area for that defect. Articles to be simply sorted are handled in the same manner.

Moreover, the two rotational movements in a cycle can be effected at the same or different rates of acceleration but in any event, are preferably at a maximum relative to the motor characteristics to ensure the cycle is completed as soon as possible and the paddle is in its rest position outside of the pathway. For example, in the situation described above for movement to conveyor 88, the initial acceleration is at about 38,000 rps and deceleration toward the stop at about 11,000 rps for a velocity of 6700 rps.

The device of the present invention has significant advantages over prior art devices, namely:
(i) simple in construction;
(ii) easily installed requiring minimal scarce space and utilities;
(iii) requires little maintenance
(iv) has rapid response times;
(v) is able to reject or sort articles moving at high speeds for prolonged periods with no reduction in efficiency
(vi) is inexpensive
(vii) operates with available inspection

I claim:

1. A method for diverting articles selected for removal from a stream of articles traveling along a pathway on a conveyor, said method comprising the steps of:
locating a deflector member adjacent to said pathway;
adapting said deflector member to (1) acceleratingly rotate into said pathway and contact a selected article at, or in a zone immediately adjacent to and below, a center of gravity thereof and (2) controllingly sweep in a manner of a sling action said selected article away from said member and remove it from said stream of articles;
further rotating said deflector member out of said pathway to allow subsequent and non-selected articles in said stream to continue along said pathway without being impeded by said deflector member; and
adapting a synchronous motor to act in response to a predetermined signal to cause said deflector member to rotate.

2. The method according to claim 1 wherein a degree of and/or a speed of rotation of the deflector are/is variable and determined by the predetermined signal to achieve a desired lateral movement of said selected article or said selected beverage container from said stream of the selected articles.

3. The method according to claim 1, wherein said signal originates from a sensing device and which identifies a specific condition selecting said article for rejection.

4. The method according to claim 1 wherein a degree of and/or a speed of rotation of the deflector is variable and is determined by the predetermined signal to achieve a desired lateral movement of said selected beverage container from said stream of the selected articles or said stream of selected beverage containers.

5. The method according to claim 1 wherein said signal originates from a sensing device and which identifies a specific condition selecting said beverage container for rejection.

6. The method according to claim 1 wherein following sweeping and removing said selected article from said stream of articles, reversing the rotation of said deflector member and removing said deflector member from said pathway to allow subsequent non-selected articles in said stream to continue along said pathway without being impeded by said deflector members.

7. A method for diverting beverage containers selected for removal from a stream of beverage containers traveling along a pathway on a conveyor, said method comprising the steps of:

locating a deflector member adjacent to said pathway, wherein said deflector member slightly deviates from the vertical toward said pathway;

adapting said deflector member to acceleratingly rotate into said pathway and initially contact a selected beverage container at, or in a zone immediately adjacent to and below, a center of gravity thereof and controllably sweep in a manner of a sling action said selected beverage container from said deflector member and remove same from said stream of beverage containers;

reversing the rotation of said deflector member;

removing said deflector member from said pathway by reversing the rotation of said deflector member to allow subsequent non-selected beverage containers in said stream to continue along said pathway without being impeded by said deflector member; and adapting a synchronous motor to act in response to a predetermined signal to cause said deflector member to rotate.

8. A device for diverting an article selected for removal from a stream of articles traveling along a pathway on a conveyor said device comprising:

a synchronous electric motor; and an article deflector member, wherein the deflector member is (i) located adjacent said pathway;

(ii) adapted to acceleratingly rotate into said pathway and contact said selected article at, or in a zone immediately adjacent to and below, a center of gravity thereof and controllingly sweep in a manner of a sling action said selected article away from said member and remove it from said stream of articles and, (iii) rotatable by said motor out of said pathway to allow subsequent unselected articles to continue traveling along said pathway without contacting said deflector member.

9. The device according to claim 8 wherein the article deflector member is mounted directly on to a drive shaft of said motor.

10. The device according to claim 9 wherein the article deflector member is elongate and is rotatable in a horizontal manner about a vertical axis.

11. The device according to claim 9 wherein said motor is adapted to rotate said deflector member out of said pathway by rotating said deflector member in a reverse direction to said first rotation.

12. The device according to claim 8, further comprising a bracket means to secure said device to an associated conveyor.

13. The device according to claim 12 wherein said bracket means is provided with an adjusting means adapted to allow a position of said article deflector means to be varied in a vertical and/or horizontal position relative to said pathway of said associated conveyor.

14. A device for diverting an article selected for removal from a stream of articles traveling along a pathway on a conveyor said device comprising a conveyor;

a synchronous electric motor; and an article deflector member, wherein said article deflector member is located adjacent said pathway and is adapted to acceleratingly rotate into said pathway and contact said selected article at, or in a zone immediately adjacent to and below, a center of gravity thereof and controllingly sweep in a manner of a sling action said selected article away from said member and remove it from said stream of articles, and is rotatable by said motor out of said pathway to allow subsequent unselected articles to continue traveling along said pathway without contacting said deflector member.

15. The device according to claim 14 wherein the article deflector member is elongate and is rotatable horizontally about a vertical axis to extend over said pathway.

16. The device according to claim 14 or 15 wherein said motor is adapted to rotate said deflector member out of said pathway by rotating same in a reverse direction to said first rotation.

17. The device according to claim 14 or 15, further comprising a bracket means to secure said deflector member to said conveyor.

18. The device according to claim 14 wherein said bracket means comprises an adjusting means adapted to allow the position of said article deflector means to be varied in a vertical and/or a horizontal position relative to said pathway of said conveyor.

* * * * *